(12) United States Patent  
Kamata et al.

(10) Patent No.: US 7,014,314 B1  
(45) Date of Patent: Mar. 21, 2006

(54) SUBSYSTEM OF PRODUCING DYE BASE BODY USED FOR DYEING OF SPECTACLE LENSES AND A SPECTACLE LENS DYEING SYSTEM INCLUDING THE DYE BASE BODY PRODUCING SUBSYSTEM

(75) Inventors: Kenichi Kamata, Kyoto (JP); Minoru Inuzuka, Aichi (JP); Tetsuo Yamada, Nagoya (JP)

(73) Assignee: Nidek Co., Ltd., Gamagori (JP)

( * ) Notice: Subject to any disclaimer, the term of this patent is extended or adjusted under 35 U.S.C. 154(b) by 0 days.

(21) Appl. No.: 09/579,062

(22) Filed: May 26, 2000

(30) Foreign Application Priority Data

May 31, 1999 (JP) ................................. 11-150821

(51) Int. Cl.  
*G02C 7/02* (2006.01)

(52) U.S. Cl. ...................... 351/159; 351/158; 351/177
(58) Field of Classification Search ........ 351/158–159, 351/162  
See application file for complete search history.

(56) References Cited

U.S. PATENT DOCUMENTS 6,095,650 A * 8/2000 Gao et al. .................. 351/227

6,315,410 B1 * 11/2001 Doshi .......................... 351/162

FOREIGN PATENT DOCUMENTS

| EP | 0 982 432 A2 | 3/2000 |
| JP | A-1-277814 | 11/1989 |
| JP | A-5-35827 | 2/1993 |
| JP | A-11-353353 | 12/1999 |

* cited by examiner

*Primary Examiner*—Jordan M. Schwartz  
(74) *Attorney, Agent, or Firm*—Oliff & Berridge, PLC (57) ABSTRACT

A subsystem for producing a dye base body used for dyeing a spectacle lens is disclosed. This subsystem includes a camera which photographs the face of a customer, a color memory which stores a plurality of color data, a color selection device for selecting a desired color data from among the plurality of color data stored in the color memory, a display controller for controlling a display to display an image of the customer's face photographed by the camera and coloring a lens area of a displayed spectacle frame image in accordance with the selected color data, a printer for printing using sublimatable dye contained therein, and a print controller for controlling the printer to print a predetermined shape with the dye on a printing base body in accordance with the selected color data to produce the dye base body.

16 Claims, 5 Drawing Sheets

SUBSYSTEM OF PRODUCING DYE BASE BODY USED FOR DYEING OF SPECTACLE LENSES AND A SPECTACLE LENS DYEING SYSTEM INCLUDING THE DYE BASE BODY PRODUCING SUBSYSTEM

BACKGROUND OF THE INVENTION

1. Field of the Invention

The present invention relates to a subsystem of producing a dye base body used for dyeing of a spectacle lens in accordance with a color and a coloring pattern selected for dyeing (coloring) the spectacle lenses, and a spectacle lens dyeing system including the dye base body producing subsystem for dyeing spectacle lenses by use of the produced base body.

2. Description of Related Art

Heretofore, when customers select spectacle lenses (which are hereinafter simply referred to as "lenses") with color in optical shops, the customers would select a desired color (and a desired coloring pattern such as a gradation pattern and others) while looking article samples, color samples, catalogs, etc. which have been prepared beforehand. Lens manufactures and lens dyehouses would perform lens-dyeing by preparing dyeing solutions (dyes) to provide the same color as that of the sample selected by each customer.

The above case, however, causes the following problems to each of the side of persons who select lens color (i.e., customers) and the other side of persons who perform lens dyeing (i.e., lens manufactures or lens dyehouses).

The color selecting side (customer) is offered the samples and the like to select a desired color while looking them. That is, he/she should make a choice among colors available in the optical shop. This usually permits the customer only a small latitude in selecting a desired color. On the other hand, the dyeing side should prepare many samples and dyeing solutions (dyes) of many colors corresponding to the samples in order to respond to various needs of customers, thus increasing cost.

Even if the choice of a slightly different color from that of the sample can be accepted, a conventional dip dyeing method and a conventional vapor phase dyeing method (see Japanese Patent Laid-open Publication No. 1-277814) are substantially unable to appropriately mix dyeing solutions or dyes so as to provide the selected color. Since there is no sample of such the desired color, the customer also occasionally feels the color of the actually dyed lens different from the color selected by himself. Furthermore, until the spectacles are completely assembled with the dyed lenses fit in a spectacles frame (hereinafter referred to as "1 frame"), the customer can not confirm whether the finished spectacles with the dyed lenses is matched to the face of the customer.

For resolving the above problems, there has been proposed an apparatus capable of photographing the face of a customer by a camera to display a picture image of the photographed face on a display while superimposing a frame image stored in advance in the apparatus and selected by the customer on the face image and applying a selected color (and a selected coloring pattern) to a lens area of the selected frame image. An example of such the apparatus is disclosed in Japanese Patent Laid-open Publication No. 11-353353.

However, the above apparatus is designed simply for allowing a customer to confirm whether the selected frame and the selected lens color (and coloring pattern) are matched to the face of the customer. Thus, in order to actually dye lenses in the selected color by use of the conventional dip dyeing method and the vapor phase dyeing method, the apparatus has to store data on producible colors (i.e., colors of prepared dye solutions or dyes) for the dyeing and therefore the customer can only select one among the stored colors.

In the conventional dyeing methods, particularly, lenses are hard to dye in various coloring patterns such as a gradation pattern. Accordingly, when a customer selects a desired color while looking article samples or picture images displayed on the above apparatus, he/she can only select one from among the coloring patterns which are actually dyeable. After all, the conventional dyeing methods allow customers only a small latitude in selecting a desired coloring pattern.

SUMMARY OF THE INVENTION

The present invention has been made in view of the above circumstances and has an object to overcome the above problems and to provide a subsystem capable of producing a dye base body used for accurately and easily dyeing spectacle lenses so as to have a desired color and coloring pattern freely selected by a customer, and a spectacle lens dyeing system including the dye base body producing subsystem.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided a subsystem for producing a dye base body used for dyeing of a spectacle lens, the subsystem including: a camera for photographing a face of a customer; color memory means for storing a plurality of color data; color selection means for selecting a desired color data from among the plurality of color data stored in the color memory means; display control means for controlling a display to display an image of the face of the customer photographed by the camera and coloring a lens area of a displayed spectacle frame image in accordance with the selected color data; printing means for printing by use of sublimatable dye contained therein; and print control means for controlling the printing means to print a predetermined shape with the dye on a printing base body in accordance with the selected color data to produce the dye base body.

According to the present invention, the customer can freely select a color and a coloring pattern of the spectacle lenses to be dyed while confirming the display which displays the photographed face image and the frame image including the lens area colored based on the selected color data. The printing means, under control of the printing control means, can print the predetermined shape with the sublimatable dye on the printing base body based on the selected color data to produce the dye base body. Thus, the lens can be accurately and easily colored with the dye applied on the dye base body in correspondence with the selected color and coloring pattern.

According to another aspect of the invention, there is provided a spectacle lens dyeing system including the above described dye base body producing subsystem for dyeing of the spectacle lens, the dyeing system including dyeing means for dyeing the spectacle lens by arranging the produced dye base body to face the spectacle lens to be dyed, heating the base body under vacuum, thereby sublimating coloring matter in the dye printed on the base body to deposit the sublimated dye onto the lens.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

A detailed description of a preferred embodiment of a spectacle lens dyeing system including a dye base body producing subsystem embodying the present invention will now be given referring to the accompanying drawings.

Figure 1:
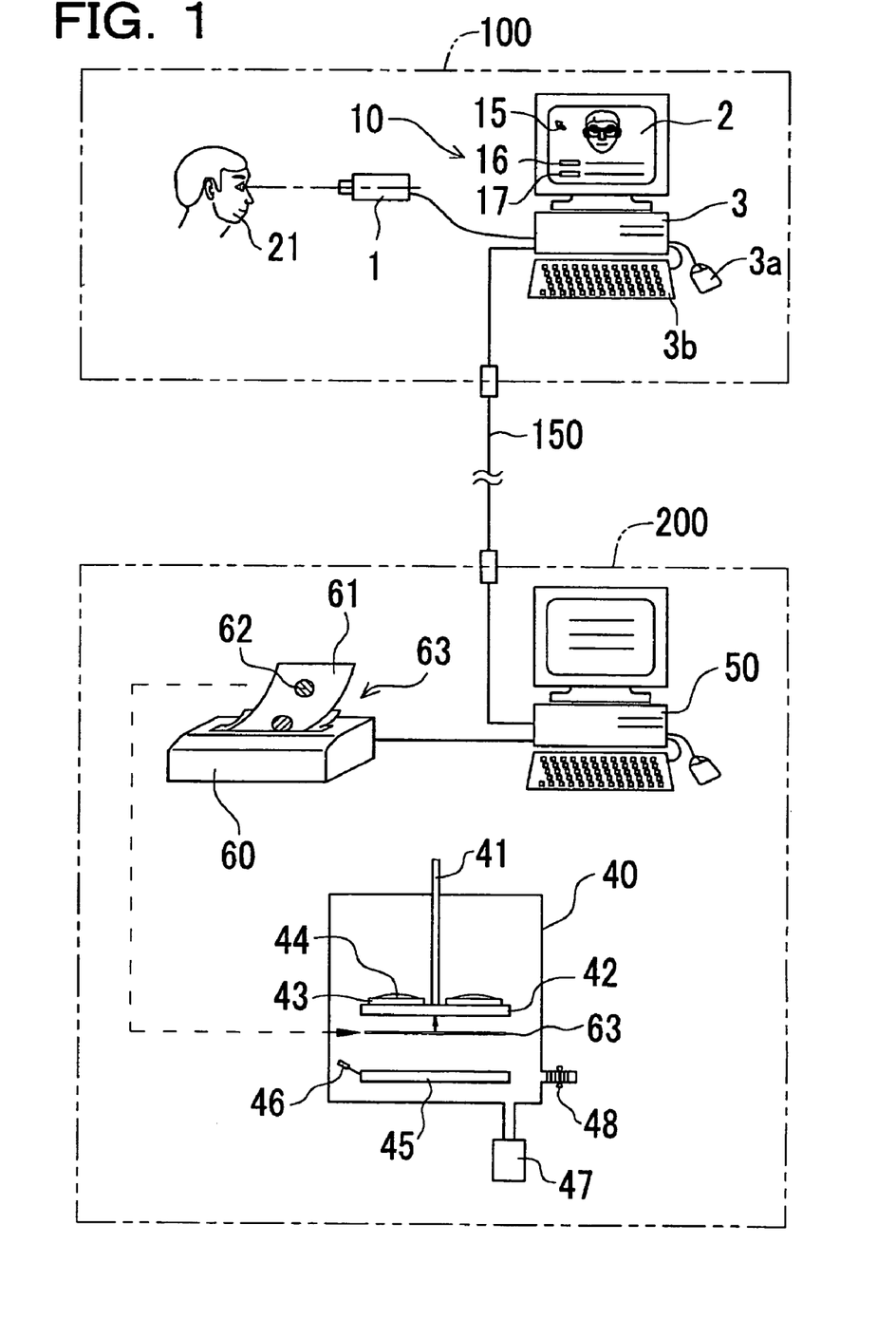
FIG. 1 is a schematic structural view of a spectacle lens dyeing system in an embodiment according to the present invention.

FIG. 1 is a schematic structural view of the spectacle lens dyeing system in the present embodiment.

Numeral 10 is a spectacle lens selection device installed in an optical shop 100. This device 10 is provided with a television camera 1, a computer 3, a color display 2. The image photographed by the cameral 1 is transmitted to the computer 3 and stored as a still picture in an image memory of the computer 3. The computer 3 also includes a program for selecting a frame, a lens color, and a lens coloring pattern. A customer can thus select a desired frame, lens color, and lens-coloring pattern while looking the photographed picture image displayed on a screen of the display 2. Numeral 3a is a mouse connected to the computer 3. Numeral 3b is a keyboard connected to the computer 3. By use of the mouse 3a and the keyboard 3b, a command is input to the computer 3.

The computer 3 is on-line linked to a computer 50 installed in a lens manufacturer 200 through a communication line 150 such as a telephone line or the like. Each of the computers 3 and 50 has a function of transmitting and receiving data on orders and others. In the lens manufacturer 200, installed are a printer 60 connected to the computer 50 and a dyeing device 40' for dyeing lenses 44. It should be noted that, if the lens manufacturer having received an order for a colored lens from the optical shop further sends an order for the dyeing of the lens to a lens dyehouse (dyer), the computer 50, the printer 60, and the dyeing device 40 are also installed in the dyehouse.

In the present embodiment, the spectacle lens selection device 10, the communication line 150, the computer 50, and the printer 60 configure the subsystem of producing a dye base body used for the dyeing of spectacle lenses. Those elements in addition to the dyeing device 40 also constitute the spectacle lens dyeing system.

The printer 60 is a general printer such as an ink-jet type printer, a plotter, etc., which are available on the market. The printer 60 prints a predetermined shape with a sublimatable dye which is a solvent for lens-dyeing onto a printing base body 61 (which is high-quality PPC white paper available on the market) to produce a dye base body 63.

Figure 2:
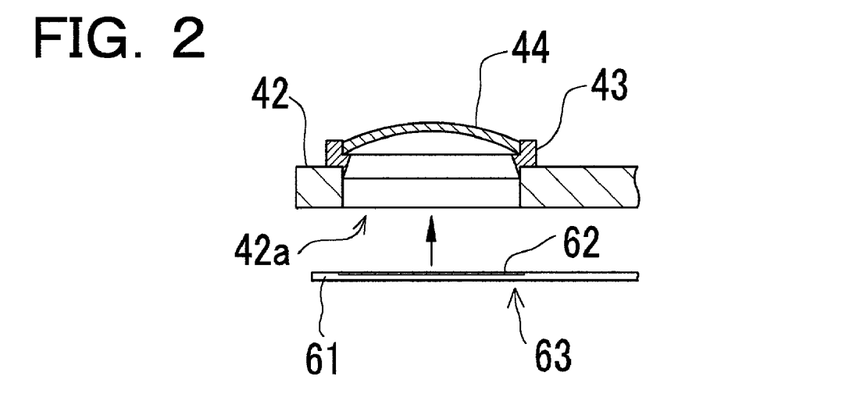
FIG. 2 is an enlarged sectional view of a part of a support plate with a hole (left one) provided in a dyeing device used in the dyeing system in the embodiment.

Next, the structure of the dyeing device 40 is explained. The dyeing device 40 is provided, in its front upper portion, with an opening not shown through which the dye base body 63 and lenses 44 are inserted into the device 40 or removed therefrom. Number 41 denotes a support shaft which is operable to move a support plate 42 for holding thereon the lenses 44 in a vertical direction, bringing the plate 42 close to the opening. The support plate 42 has two circular holes 42a disposed symmetrically with respect to the support shaft 41, i.e., at a right and left sides thereof in FIG. 2. FIG. 2 shows an enlarged view of a left one of the holes 42a. The circular hole 42a is designed to have a larger diameter than that of the lens to be placed thereon. Numeral 43 is a cylindrical lens-holder disposed so that the back surface of the lens 44 put on the holder 43 faces the holes 42a. On the underside of the support plate 42, the dye base body 63 is attached so that the colored layer (made of printed sublimatable dye) 62 is positioned on the upper surface of the body 63 in correspondence with the hole 42a, thereby to allow the dye (coloring matter) of the colored layer 62 to sublimate toward the lens 44 through the hole 42a of the plate 42.

The material of the plastic lens 44 which is dyable with sublimatable dye is selected from polycarbonate resin (e.g., diethyleneglycol bis-allyl carbonate polymer (CR-39)), polyurethane resin, allyl resin (e.g., allyl diglycol carbonate and its copolymer, and diallyl phthalate and its copolymer), fumaric acid resin (e.g., benzyl fumarate copolymer), styrene resin, polymethyl acrylate resin, fibrid resin (e.g., cellulose propionate) and so on.

Numeral 45 is a heater for sublimating the dye printed on the dye base body 63. The setting of this heater 45 is adjustable to a desired temperature value. The material of the heater 45 in the present embodiment is aluminum which is high in thermal conductivity. By the passage of an electric current through a Nichrome wire not shown provided inside the heater 45, the surface temperature of the heater 45 is increased. This surface temperature is sensed by a temperature sensor 46 to detect whether or not the temperature reaches a preset value.

A rotary vacuum pump 47 is used to produce an almost vacuum in the dyeing device 40. Numeral 48 is a leak valve provided in the device 40. This valve 48 is opened after the dyeing operation to take air into the device 40 maintained under vacuum, thereby to return it to an atmospheric pressure.

Next, explanation is made on operations from selection of a lens color and a coloring pattern in an optical shop to dyeing of the lens in a lens manufacturer or a dyehouse. First, the selection of a frame, a lens color and a coloring pattern using the selection device 10 is described below.

When the power of the device 10, or the computer 3, is turned on, calling the selection program, a photograph/memory mode is automatically established. An operator in the optical shop requests a customer to put on a desired frame and takes a picture of the customer wearing the selected frame by the camera 1. The operator (or the customer himself) confirms the photographed picture image displayed on the screen of the display 2 and clicks the left button of the mouse 3a to store the photographed image as a still picture image in the image memory of the computer 3. The customer may put on several desired frames alternately. Every time the customer puts on one, the operator similarly operates to take a picture of the customer's face to store it in the image memory.

Sequentially, the operator operates the mouse 3a to position a pointer 15 in a key (icon) 16 displayed on the screen and clicks the mouse button, thus switching the photograph/memory mode to a frame selection mode. At this time, the still picture images stored in the image memory are displayed on the screen of the display 2, for example, on a two-split screen to permit the display of two picture images. Thus, the customer can decide a desired frame while visually confirming and comparing the displayed picture images. It is to be noted that the images of only frames may be stored in advance in the image memory of the computer 3. In this case, the customer is photographed by the camera 1 without wearing a frame so that the frame image stored in the memory is superimposed on the photographed face image, thereby to display the customer's face as if wearing the frame.

Figure 3:
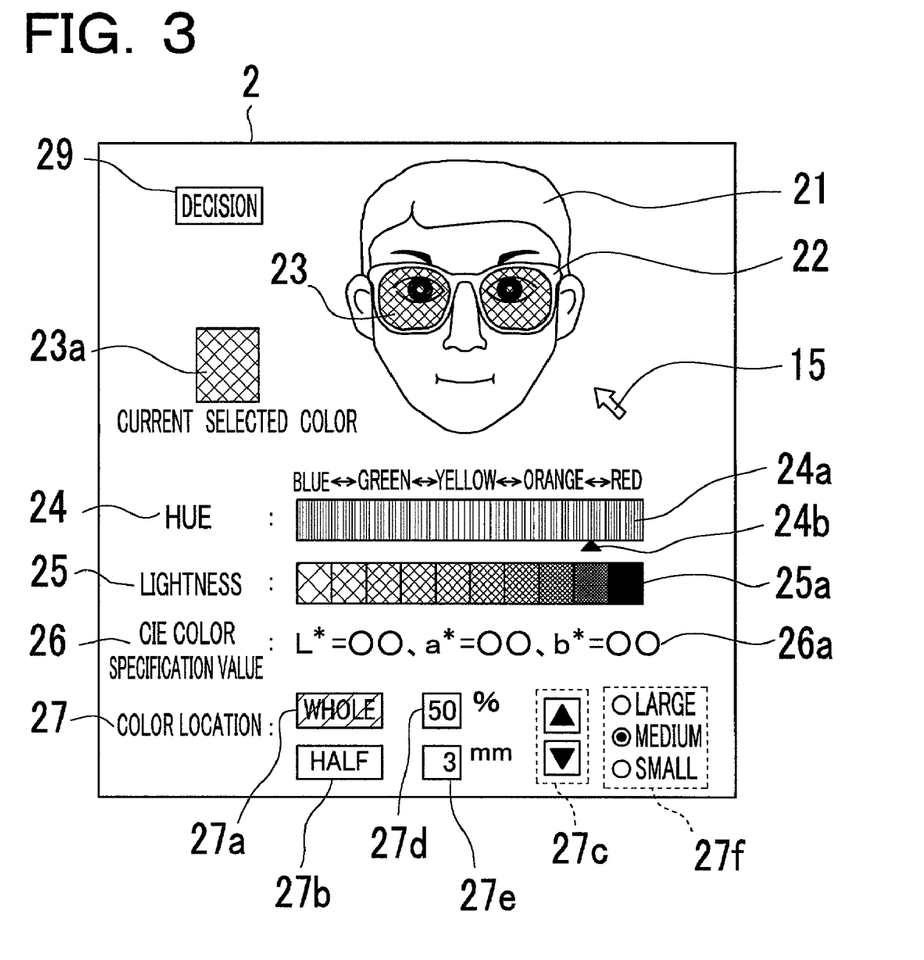
FIG. 3 is an example of a screen of a display to select lens colors and coloring patterns.

After decision of a desired frame by the customer, the operator positions the pointer 15 in a key (icon) 17 displayed on the screen (see FIG. 1) and clicks the key 17, thereby to switch the frame selection mode to a lens color selection mode of selecting a lens color and a coloring pattern. FIG. 3 shows an example of the screen in this mode. Numeral 21 is an image of the face of the customer. Numeral 22 is a frame image. In this mode, the computer 3 is made to recognize where the lens area within the frame image 22 is located. Specifically, the operator operates the mouse 3a to point the pointer 15 to a border between the frame and the lens on the screen and clicks the left mouse button on several points one by one along the border. Thus, a lens area 23 can be specified within the frame image 22.

In the lens area 23, the color and the coloring pattern which were selected in the last use of the device 10 first appear. The color also appears within a window 23a on the screen in order to obviously show the color tone of the selected color. To change the hue (tint) of the lens area 23 to a desired hue, the operator places the pointer 15 to the desired hue point in a bar 24a of a hue item 24 and clicks the mouse button or drags and drops a cursor 24b to any point by operation of the clicks of the mouse 3a. To change the lightness (density) of the lens area 23, the operator places the pointer 15 to the desired lightness point in a bar 25a of a lightness item 25. In the present embodiment, the bar 25a is configured of several sections of lightness changed in a step-by-step manner. Alternatively, the bar 25a may be configured of a single section of lightness continuously changed.

The color produced by combination of the selected hue and lightness in the hue item 24 and the lightness item 25 is indicated as a CIE color specification value 26, for example, in the form of numeric data such as L*=○○, a*=○○, b*=○○ as shown in FIG. 3. This CIE specification value 26 has been determined based on the standard for the chromaticity diagram called CIE1976(L*a*b*)/CIELAB that has been developed by CIE (Commission International d'Eclairage), wherein L* is the component which shows the lightness (luminance); a* is the component which shows the hue in the range of red to green; b* is the component which shows the hue in the range of blue to yellow (it is based on the opponent-colors theory).

In the above way, the color is indicated as numeric data based on the predetermined standard, so that it can be controlled or managed as unified color data to reduce differences between apparatus or computers. Specifically, if the computers 3 and 50 manage color as numeric data based on the same standard, the printer 60 connected to the computer 50 can print substantially the same color as that selected on the computer 3. Such the standard of color is not limited to the above standard.

Figure 4:
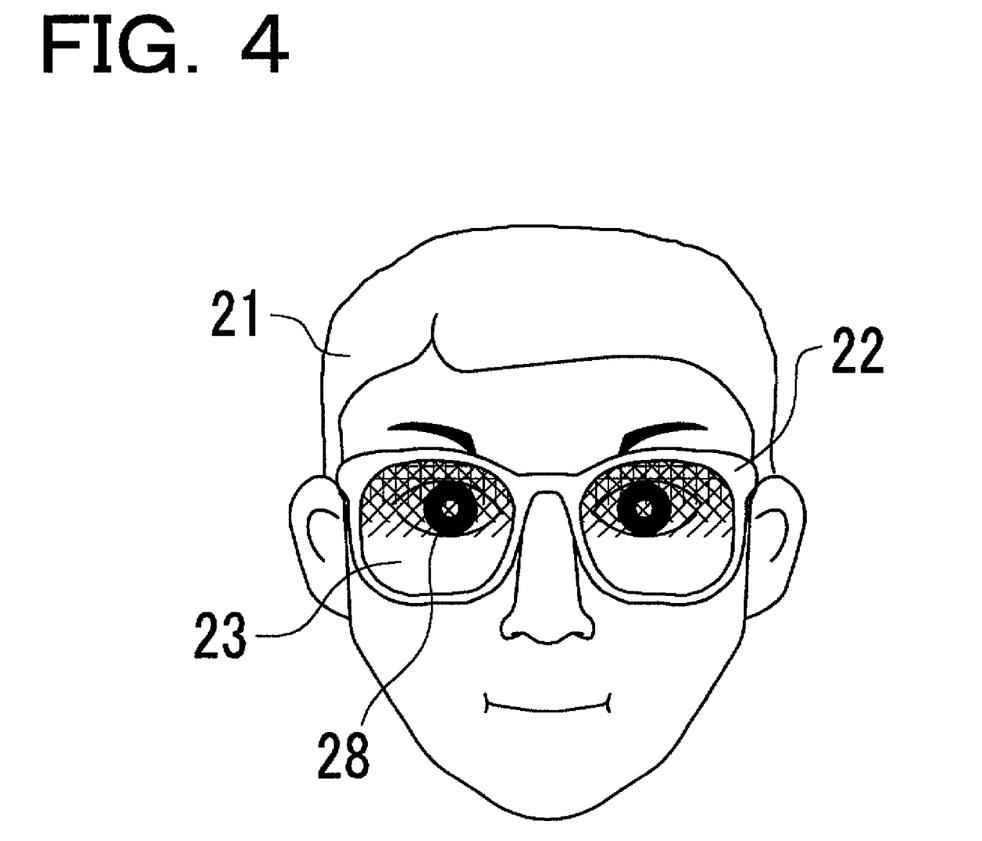
FIG. 4 is an explanatory view of showing a method of obtaining locational data to produce a half (gradation) pattern as a lens coloring pattern.

Changing the coloring pattern is performed as follows. To provide the coloring pattern to the whole of the lens area 23, a "WHOLE" key (icon) 27a in a color arrangement item 27 is designated and clicked. To provide the coloring pattern to half (gradation) of the lens area 23, alternatively, a "Half" key (icon) 27b is designated and clicked. In the case of selecting the half pattern, the coloring range can be arbitrarily changed by clicking a coloring range changing key (icon) 27c. The value of the thus changed coloring range appears in a display box 27d. For example, when the coloring range is changed to 50%, the 50% range from the top within the frame image 22 displayed on the screen is colored in the selected color as shown in FIG. 4.

In the present embodiment, the setting of the location of the half pattern (the coloring range) is made in relation to the top and bottom of the frame image 22. It is therefore necessary to convert the location to distance data from the lens center (the optical center) in order to set the range with respect to the lens 44 to be dyed. This can be made in the following manner.

The size of the face image 21 is determined by a photographing magnification. Accordingly, when photographing is made after the distance between the customer's face and the camera 1 is adjusted in advance to a predetermined distance, the actual size of the face can be found based on the size of the face image 21 displayed on the screen. As shown in FIG. 4, therefore, with a mouse-click while the pointer 15 is positioned in the center 28 of the pupil of the face image 21, the computer 3 can obtain the location of the half pattern (the coloring range) as the actual distance from the pupil center 28. At the time of dyeing of the lenses 44, the position of the pupil center input as above is converted to the position of the lens center (the optical center) so that the location of the half pattern (the coloring range) can be indicated as distance data from the lens center (the optical center). The distance data appears in a display box 27e.

In the case of the half (gradation) pattern, the range is colored so that the color may gradually fade for the lower part of the range. This fading degree can be selected from among "Large", "Medium", and "Small" in an item 27f. Of course, this fading degree may be arbitrarily set to be continuously variable. The selection of the lens color may be made to separately color the upper and lower parts of the lens area 23 in different colors. In this case, the apparatus is arranged so that, in addition to the selection of the half pattern, the hue 24 and the lightness 25 of the lower part of the lens area 23 can be set.

In the above manner, the customer can freely select the color and the coloring pattern of a lens while confirming whether the lens color and coloring pattern match his/her face by looking the photographed and displayed face image with the spectacle images on the screen. Upon completion of the selection of the lens color and coloring pattern, a decision key (icon) 29 is clicked to store the picture image of the face wearing the spectacle, the selected color data, and the selected coloring pattern data in the computer 3.

To send an order for the lenses from the optical shop 100 to the lens manufacturer 200, the operator in the shop 100 operates the computer 3 to call a program for order and inputs prescription data including the refractive power of the lens and others. Then, the computer 3 is operated to on-line transmit the selected and stored color date and coloring pattern data in combination with the prescription data to the computer 50. If the lens dyeing is performed in the dyehouse, the data is further transmitted to the computer 50 installed in the dyehouse via that in the lens manufacturer.

The color data on-line input to the computer 50 is managed as numeric data based on the predetermined standard. The computer 50 decompresses the color data based on the same standard as in the computer 3. Accordingly, the computer 50 can reproduce the same color as that selected in the optical shop 100 (the selection device 10). The location of the half pattern (the coloring range) is managed in the form of numeric data of the distance from the lens center (optical center), so that the computer 50 can decompress the coloring pattern data based on the same standard as in the computer 3 to faithfully reproduce the same coloring pattern. Thus, the computer 50 controls the printer 60 based on the numeric data on the color and the numeric data on the coloring pattern to print a predetermined shape with the sublimatable dye onto the printing base body 61, thereby producing the dye base body 63 to be used for the lens-dyeing.

For example, when the printer 60 is an ink-jet printer (which is, in the present embodiment, a printer "Super Metier" manufactured by INTTC Co., Ltd.), ink cartridges of the printer are filled respectively with sublimatable disperse dye inks (water-base) of red, blue, and yellow. In the present embodiment, for example, each of the dye inks is prepared by mixing the following dye, dispersant, and ion-exchange water in the prescription below.

Using Dyes
Red: Kayalon Polyester Light Red B-S 200
  (made by Nippon Kayaku Co., Ltd.)
Yellow: Kayalon Microester Yellow AQ-LE
  (made by Nippon Kayaku Co., Ltd.)
Blue: Dianix Blue AC-E (made by DyStar Japan Ltd.)
Dispersant: Demol MS (made by Kao Corporation)
Prescription (Dye:Dispersant:Ion-Exchange Water)
Red: 1.0 wt %:0.2 wt %:98.8 wt %
Yellow: 3.0 wt %:0.5 wt %:96.5 wt %
Blue: 3.0 wt %:0.5 wt %:96.5 wt %

To print an intended color on the printing base body 61, regulation (preparation) of the dye inks is numerically controlled by the computer 50. The color thus can be easily produced in response to individual orders. For dyeing of the whole area of a lens, the colored layer 62 is printed in a substantially circular shape on the printing base body 61. For dyeing of the half area of a lens, the colored layer 62 is printed in a substantially circular or semicircular shape on the printing base body 61. On the base body 61, such the colored layers 62 are printed in pairs. This is because the previously printing in pairs is more convenient for dyeing a pair of spectacle lenses; a right and left lenses. The diameter of the colored layer 62 is preferably determined to have a substantial equal to or a slightly larger than that of the lens to be dyed in order to prevent the possibility that the dye may not be fully spread over the whole coloring area of the lens if the diameter of the colored layer 62 is smaller than the lens diameter.

Next, producing of the dye base body of the half (gradation) coloring pattern is explained using a concrete example thereof, referring to FIGS. 5A–5D which are schematic views of base bodies produced with the half (gradation) pattern.

Figure 5A:
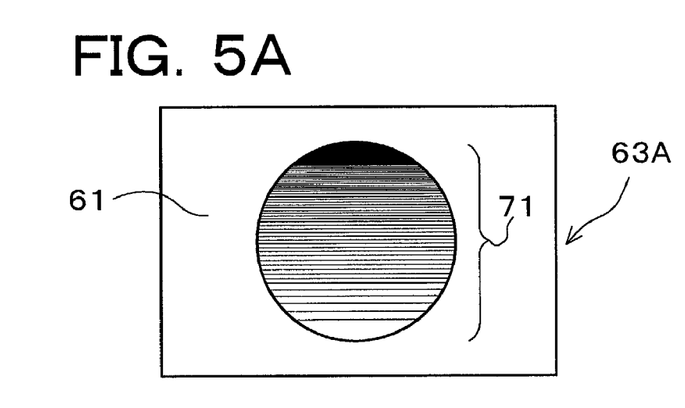
FIGS. 5A–5D are schematic views of dye base bodies produced for a half (gradation) pattern.
Figure 5B:
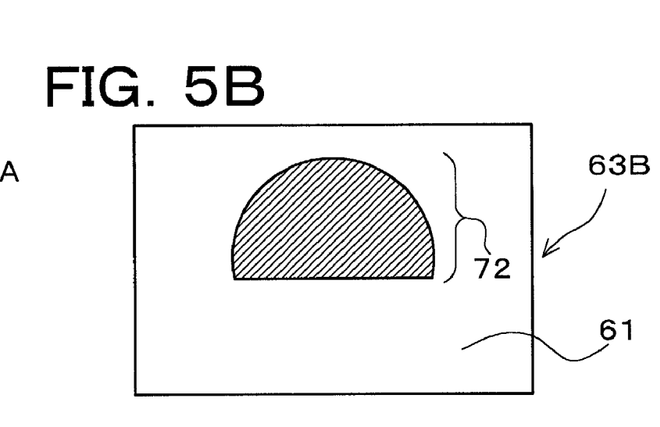
Figure 5C:
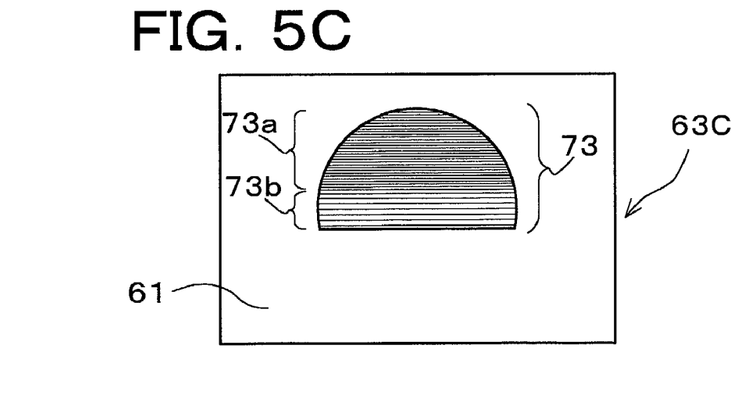
Figure 5D:
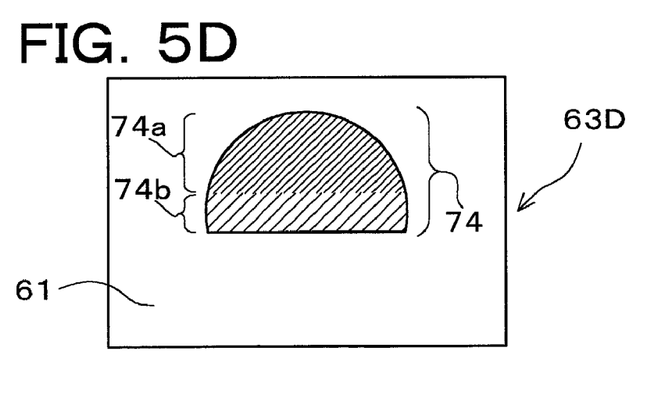

A dye base body 63A in FIG. 5A is produced by printing a colored layer 71 in a gradation manner on the printing base body 61. A dye base body 63B in FIG. 5B is produced by printing a colored layer 72 in the form of a substantial semicircle on the printing base body 61 with the constant color density in the entire colored layer 72. A dye base body 63C in FIG. 5C is produced by printing a colored layer 73 so that about two thirds of the layer 73 (a colored layer 73a) is colored in constant density (which is the same as that of the colored layer 72), while the remaining one-third (a colored layer 73b) is colored in a gradation manner. A dye base body 63D in FIG. 5D is produced by printing a colored layer 74 so that two thirds of the layer 74 (a colored layer 74a) is colored in dark density (which is the same as that of the colored layer 72) and the remaining one-third (a colored layer 74b) is colored in light density (which is about half of the dark density). The colored layers 71–74 are made equal in hue. The location of the half pattern (the coloring range) of the colored layers 72–74 are made identical.

Figure 6:
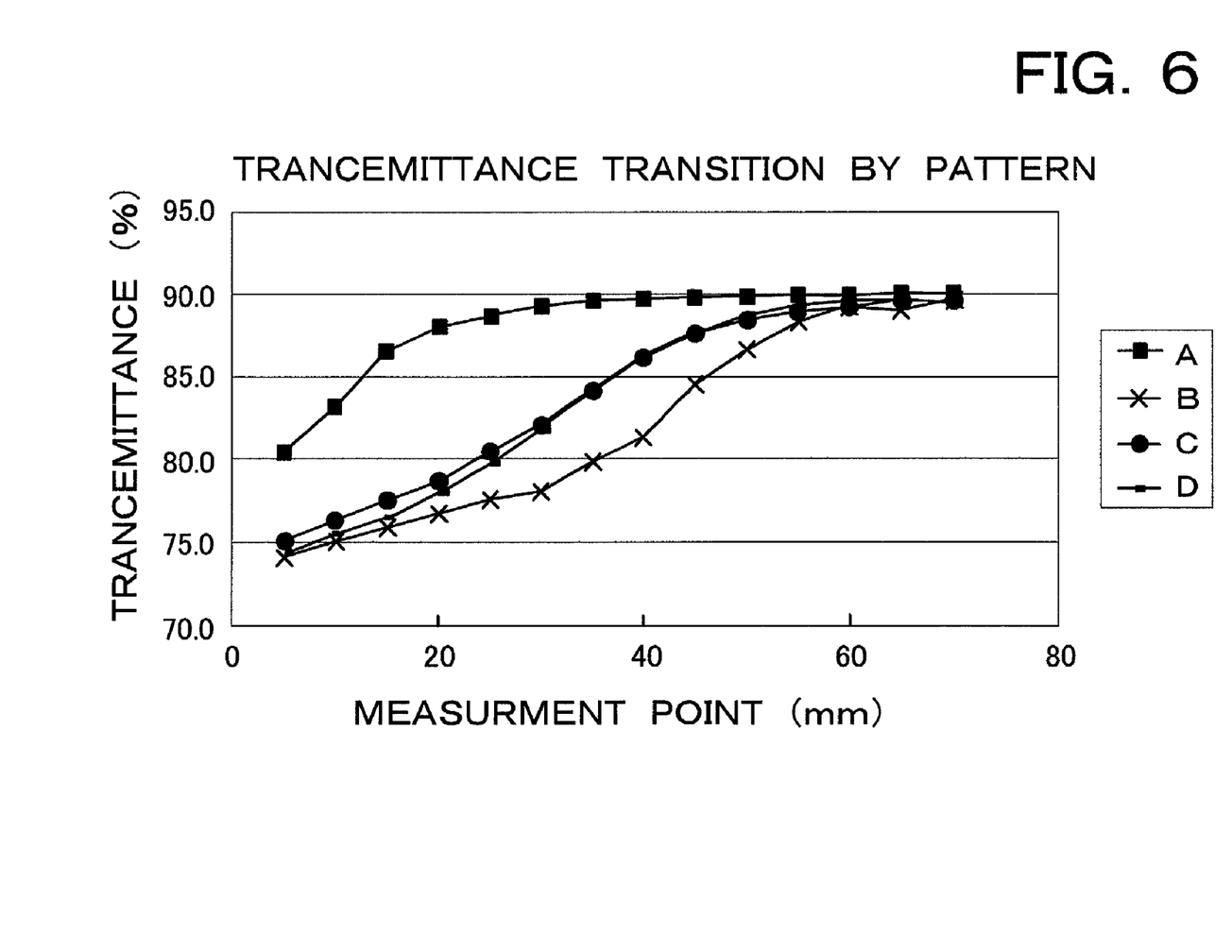
FIG. 6 is a graph showing the transmittance of lenses dyed using the dye base bodies shown in FIGS. 5A–5D.

According to the present embodiment, by the use of those dye base bodies 63A–63D produced as above, the lenses 44 were dyed in accordance with the above described dyeing method. After dyeing, the transmittance of the lenses 44 were measured. This measurement was carried out using a measurement device; MODEL 304 manufactured by ASAHI SPECTRA CO., LTD. The measurement results are shown in FIG. 6 graphing transmittance transitions by pattern. In the graph, the horizontal axis indicates the measuring positions, while the vertical axis indicates the transmittance measured at each measuring position. It is to be noted that, it is shown that as the transmittance is lower, the color density of the dyed lens is higher. Four lines A, B, C, and D plot the results of the lenses dyed by the use of the dye base body 63A–63D, respectively. In the above manner, the lenses 44 were dyed with respective gradation patterns by the use of the corresponding dye base bodies 63A–63D. As shown in the graph, for example, with the dye base body 63A, the lens 44 was dyed with a gradation pattern including a small part colored in dark density and then suddenly reducing density. With the dye base bodies 63C and 63D, the lenses 44 were dyed with a gradation pattern including a constant density transition. With the dye base body 63B, the lens 44 was dyed with a gradation pattern including a large part colored in dark density and then suddenly reducing density.

Consequently, if the gradation pattern shown by the line A in FIG. 6 is selected, the dye base body 63A having the colored layer 71 shown in FIG. 5A is produced. If the gradation pattern shown by the line C or D is selected, the dye base body 63C or 63D having the colored layer 73 or 74 shown in FIG. 5C or 5D is produced. If the gradation pattern shown by the line B is selected, the dye base body 63B having the colored layer 72 is produced. Furthermore, if a gradation pattern which is intermediate between the above patterns, similarly, a dye base body having a correspondingly colored layer is produced. Although the conventional dyeing could not realize the above described various fine gradations, the present invention can achieve the dyeing capable of providing various fine gradations by production of the dye base bodies of various patterns.

The dyeing of the lens 44 by means of the dyeing device 40 is performed as follows. The support shaft 41 is first moved up to lift the support plate 42 upward to the upper portion in a housing of the device 40. Then, the dye base body 63 is inserted and attached to the underside of the support plate 42 with tapes or the like so that the colored layers 62 formed on the base body 63 face upward. At the time of attachment, the base body 63 is adjusted to position the two colored layers 62 in a one-to-one correspondence with the two holes 42a of the support plate 42. Upon completion of the attachment of the base body 63 to the underside of the support plate 42, the lens holder 43 is set on the upside of the plate 42. The lenses 44 are put in the holder 43 with the concave surface sides facing downward. Subsequently, the heater 45 is heated. In the present embodiment, the heater temperature is set to a predetermined value in a range of 100–200° C.

When the temperature sensor 46 detects that the heater temperature reaches the predetermined value, the dyeing device 40 is airtightly closed and the rotary pump 47 is actuated to produce a vacuum in the device 40. After confirmation of the temperature of the heater 45 having reached the set value, the support shaft 41 is operated to move the support plate 42 down until the plate 42 comes into contact with the heater 45. Thus, the sublimatable dye (the coloring matter) applied on the base body 63 is sublimated and deposited onto the lenses 44. The lenses 44 are thus colored (dyed).

Upon completion of the heating, the leak valve 48 is opened to return the pressure of the device 40 to normal. Then, the dyeing device 40 is opened to allow the lenses 44 to be taken out. Although the sublimated dye has been deposited on the lenses 44, it is apt to come off if left as it is. To avoid this, the lenses 44 are further heated in an oven not shown under normal pressure to fix the deposited dye on the lens 44. This process is carried out by increasing the temperature of the oven to a set value which is as high as possible below the lens resistible temperature, heating the lenses 44 in the oven for the predetermined duration needed for giving the desired hue and lightness to the lenses 44, and then taking the lenses 44 out of the oven.

In the present embodiment, the dye base body 63 is placed under the lenses 44 at dyeing. Alternatively, the base body 63 may be placed above the lenses 44. In this case, the lenses 44 are arranged with the concave surface sides facing up to face the printed surface of the base body 63. Instead of the heater 45, accordingly, a halogen lamp is used to heat the dye base body 63 from above. In such the arrangement, the edge of the convex surface side of the lens 44 is kept into contact with the lens holder 43. This enables the dyeing of the whole area of the convex surface of the lens 44.

The vapor-phase dyeing method described above needs no large sized equipment required in the dip dyeing method, and also enables the dyeing of lenses by the printer 60 and the dyeing device 40 which are compact in size. Accordingly, the printer 60 and the dyeing device 40 may be installed in the optical shop 100 to perform the dyeing of lenses in the optical shop 100. In this case, the computer 50 may be omitted, and the printer 60 may be driven if directly connected to the computer 3.

The present invention may be embodied in other specific forms without departing from the spirit or essential characteristics thereof.

For instance, although the water-based ink is used in the above embodiment, the use of oil-based ink can also provide the same effects. In the case of the oil-based ink, a head portion of the ink cartridge is liable to be clogged with the ink when dried. For avoiding such the undesired state, the printing is preferably performed by an ink-jet printer of a piezoelectric type.

Regarding the heating way of the dye base body, the dye can be similarly sublimated by the heating of the base body from the side thereof, instead of the heating from above or below as mentioned above.

According to the present embodiment of the invention, as mentioned above, the customer can freely select a color and a coloring pattern of the spectacle lenses to be dyed, and the lens manufacturer (or dyehouse) can accurately and easily dye the lenses in correspondence with the selected color and coloring pattern.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment selected and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A subsystem for producing a dye base body used for dyeing of a spectacle lens, the subsystem including:
    a camera for photographing a face of a customer;
    color memory means for storing a plurality of color data;
    color selection means for selecting a desired color data from among the plurality of color data stored in the color memory means;
    display control means for controlling a display to display an image of the face of the customer photographed by the camera and coloring a lens area of a displayed spectacle frame image in accordance with the selected color data;
    printing means for printing by use of sublimatable dye contained therein; and
    print control means for controlling the printing means to print a predetermined shape with the dye on a printing base body in accordance with the selected color data to produce the dye base body.

2. The dye base body producing subsystem for dyeing of the spectacle lens according to claim 1 further including:
    frame memory means for storing a plurality of spectacle frame images; and
    frame selection means for selecting a desired spectacle frame image from among the plurality of spectacle frame images stored in the frame memory means;
    wherein the display control means controls the display to display the image of the face of the customer photographed by the camera while superimposing the selected spectacle frame image on the face image, and to display the lens area of the displayed frame image while coloring it in accordance with the selected color data.

3. The dye base body producing subsystem for dyeing of the spectacle lens according to claim 1 further including:
    pattern memory means for storing a plurality of coloring pattern data; and
    pattern selection means for selecting a desired coloring pattern data from among the plurality of coloring pattern data;
    wherein the display control means controls the display to display the lens area of the displayed spectacle frame image while coloring it in accordance with the selected color data and the selected coloring pattern data, and
    the print control means controls the printing means to print the predetermined shape with the dye on the printing base body in accordance with the selected color data and the selected coloring pattern data to produce the dye base body.

4. The dye base body producing subsystem for dyeing of the spectacle lens according to claim 1 further including:

a first computer in which the color memory means, the color selection means, and the display control means are provided;

a second computer in which the print control means is provided; and transmitting means for connecting the first and second computers by a communication line to transmit the selected color data to the print control means.

5. The dye base body producing subsystem for dyeing of the spectacle lens according to claim 4, wherein the color memory means and the print control means manage the color data based on the same standard.

6. The dye base body producing subsystem for dyeing of the spectacle lens according to claim 4, wherein the first computer includes prescription input means for inputting prescription data including refractive power of the spectacle lens, and the second computer includes managing means for managing the selected color data transmitted to the print control means of the second computer in association with the prescription data input by the prescription input means.

7. The dye base body producing subsystem for dyeing of the spectacle lens according to claim 1, wherein the predetermined shape to be printed with the dye includes a substantially circular shape having a diameter which is substantially equal to or larger than that of the spectacle lens to be dyed.

8. The dye base body producing subsystem for dyeing of the spectacle lens according to claim 3, wherein the coloring pattern data includes gradation pattern data, and the predetermined shape to be printed with the dye includes at least one of a substantially circular shape or a substantially semicircular shape, each shape having a diameter which is substantially equal to or larger than that of the spectacle lens to be dyed.

9. The dye base body producing subsystem for dyeing of the spectacle lens according to claim 8 further including:

optical center input means for inputting data on an optical center of the spectacle lens to be dyed;

wherein the print control means controls the printing means to print the substantially semicircular shape with the dye in accordance with the optical center data input by the optical center input means.

10. The dye base body producing subsystem for dyeing of the spectacle lens according to claim 9, wherein the optical center input means includes pupil center input means for inputting data on a pupil center based on the face image displayed on the display, and the print control means controls the printing means to print the substantially semicircular shape with the dye based on the pupil center data input by the pupil center input means, the pupil center data being used as the optical center data.

11. The dye base body producing subsystem for dyeing of the spectacle lens according to claim 1, wherein the display control means controls the display to display the plurality of color data stored in the color memory means by separating it into at least hue and lightness, and the color selection means includes means for individually selecting hue and lightness with reference to the separately displayed hue and lightness.

12. The dye base body producing subsystem for dyeing of the spectacle lens according to claim 3, wherein the coloring pattern data includes gradation pattern data, and the pattern selection means includes means for inputting a coloring range as a proportion to the lens area.

13. The dye base body producing subsystem for dyeing of the spectacle lens according to claim 12, wherein the pattern selection means includes means for selecting a degree of gradation.

14. The dye base body producing subsystem for dyeing of the spectacle lens according to claim 1, wherein the printing base body includes general paper which is available on the market.

15. The dye base body producing subsystem for dyeing of the spectacle lens according to claim 1, wherein the printing means includes a general printer of an ink-jet type which is available on the market.

16. A spectacle lens dyeing system including the dye base body producing subsystem for dyeing of the spectacle lens according to claim 1, the dyeing system including dyeing means for dyeing the spectacle lens by arranging the produced dye base body to face the spectacle lens to be dyed, heating the dye base body under vacuum, thereby sublimating coloring matter in the dye printed on the dye base body to deposit the sublimated dye onto the lens.

* * * * *